United States Patent
Shiotani et al.

(10) Patent No.: US 9,156,380 B2
(45) Date of Patent: Oct. 13, 2015

(54) VEHICLE SEAT OF TYPE HAVING UPWARDLY FOLDABLE SEAT CUSHION

(71) Applicants: Hideya Shiotani, Tokyo (JP); Yoshikazu Kijima, Tokyo (JP); Hiroshi Nakao, Tokyo (JP); Taichi Yokoyama, Tokyo (JP)

(72) Inventors: Hideya Shiotani, Tokyo (JP); Yoshikazu Kijima, Tokyo (JP); Hiroshi Nakao, Tokyo (JP); Taichi Yokoyama, Tokyo (JP)

(73) Assignee: TACHI-S CO., LTD. (JP)

( * ) Notice: Subject to any disclaimer, the term of this patent is extended or adjusted under 35 U.S.C. 154(b) by 0 days.

(21) Appl. No.: 14/353,271

(22) PCT Filed: Mar. 25, 2013

(86) PCT No.: PCT/JP2013/058572
§ 371 (c)(1),
(2) Date: Apr. 21, 2014

(87) PCT Pub. No.: WO2013/146679
PCT Pub. Date: Oct. 3, 2013

(65) Prior Publication Data
US 2014/0265498 A1    Sep. 18, 2014

(30) Foreign Application Priority Data

Mar. 26, 2012    (JP) ................................. 2012-069507

(51) Int. Cl.
*B60N 2/30* (2006.01)
*B60N 2/36* (2006.01)

(52) U.S. Cl.
CPC .............. *B60N 2/3063* (2013.01); *B60N 2/305* (2013.01); *B60N 2/309* (2013.01); *B60N 2/3013* (2013.01); *B60N 2/3065* (2013.01); *B60N 2/36* (2013.01); *B60N 2/366* (2013.01)

(58) Field of Classification Search
CPC .... B60N 2/305; B60N 2/3065; B60N 2/3063; B60N 2/682; B60N 2/3013; B60N 2/36; B60N 2/309; B60N 2/366
USPC .................................. 297/334, 335, 336, 331
See application file for complete search history.

(56) References Cited

U.S. PATENT DOCUMENTS 2,153,155 A * 4/1939 Page et al. ..................... 297/342
4,637,653 A * 1/1987 Yoshida et al. ............... 297/334

(Continued)

FOREIGN PATENT DOCUMENTS

JP    60-46442    4/1985
JP    2007-191120    8/2007

(Continued)

OTHER PUBLICATIONS

International Search Report dated May 7, 2013 issued in corresponding International patent application No. PCT/JP2013/058572.

*Primary Examiner* — Joshua J Michener
*Assistant Examiner* — Matthew Gitlin
(74) *Attorney, Agent, or Firm* — Ostrolenk Faber LLP (57) ABSTRACT

A vehicle seat having an upwardly-foldable seat cushion that includes an engagement piece projecting from the rear end of the seat cushion and an under cover below the seat having an upper panel portion having an upwardly sloped surface. A forwardly-and-rearwardly extending guide groove formed in that upper panel portion which allows the engagement piece to be moved therein, without its contact with the upwardly sloped surface of the upper panel portion, when the rear end of the seat cushion is slidingly brought to a lower end of a set back. Ribs are formed in a bottom surface of the guide groove. The guide groove allows forward-and-rearward movement of the engagement piece therein, so that the engagement piece can be pressed against and frictionally engaged with the lower end of the seat back, without being caught by the upwardly sloped surface of the upper panel portion.

8 Claims, 4 Drawing Sheets

(56) References Cited

U.S. PATENT DOCUMENTS

| | | | |
|---|---|---|---|
| 5,558,386 A * | 9/1996 | Tilly et al. | 296/65.05 |
| 5,570,931 A * | 11/1996 | Kargilis et al. | 297/378.12 |
| 5,662,368 A * | 9/1997 | Ito et al. | 296/65.05 |
| 5,795,023 A * | 8/1998 | Kayumi | 297/331 |
| 5,934,732 A * | 8/1999 | Jakubiec | 296/65.01 |
| 6,155,639 A * | 12/2000 | Frolo | 297/331 |
| 6,293,603 B1 * | 9/2001 | Waku et al. | 296/65.09 |
| 6,695,405 B2 * | 2/2004 | Senseby et al. | 297/378.1 |
| 7,246,857 B2 * | 7/2007 | Kim | 297/331 |

FOREIGN PATENT DOCUMENTS

| | | |
|---|---|---|
| JP | 2009-255718 | 11/2009 |
| JP | 2010-234941 | 10/2010 |
| JP | 2010-234942 | 10/2010 |
| JP | 2011-131782 | 7/2011 |

* cited by examiner

VEHICLE SEAT OF TYPE HAVING UPWARDLY FOLDABLE SEAT CUSHION

CROSS-REFERENCE TO RELATED APPLICATIONS

The present application is a 35 U.S.C. §§371 national phase conversion of PCT/JP2013/58572, filed Mar. 25, 2013, which claims priority of Japanese Patent Application No. 2012-069507, filed Mar. 26, 2012, the contents of which are incorporated by reference herein. The PCT International Application was published in the Japanese language.

TECHNICAL FIELD

The present invention relates to a vehicle seat of the type wherein the seat cushion thereof can be folded upwardly to a vertically folded position, with a rear end of the seat cushion being raised, and then the seat back of the seat be folded forwardly and downwardly.

BACKGROUND ART

Many vehicle seats of the type wherein the seat cushion thereof can be folded upwardly are widely used as a rear seat including a second seat or a third seat. In this sort of seat, the seat cushion has its front end portion swingably connected to a floor of vehicle by a connecting means. Such connecting means for example includes a substantially "U" shaped connecting rod formed by bending a rod-like element into a substantially "U" shape, or has left and right connecting links. Hence, the seat cushion is arranged on the floor of the vehicle such that a rear end of the seat is movable upwardly relative to the front end portion thereof, whereas a seat back of the seat is arranged above the floor of vehicle so as to be foldable forwardly and downwardly. (See Japanese Laid-Open Patent Publications Nos. 2009-255718 and 2007-191120, for instance) With this seat arrangement, the seat cushion is first folded upwardly to a vertically folded position and thereafter the seat back is folded forwardly and downwardly to a substantially horizontal position, providing a luggage space over a rear surface of the thus-folded seat back. In this mode of prior art, both the seat cushion and the seat back are directly mounted on the floor of vehicle There is also a known seat of this kind in which the seat cushion and the seat back are not directly mounted on the vehicle floor, but are disposed on a base element (support base) which is provided on the floor of vehicle.

The seat cushion is normally retained in a substantially horizontal use position where a seat occupant may sit thereon. Then a rear end of the seat cushion is located below a lower end of the seat back so as to be in close contact with and restrained by that lower end of the seat back, to the extent that no clearance exists between those seat cushion's rear end and seat back's lower end. Further, there is an engagement means between the rear end of the seat cushion and the lower end of the seat back. The engagement means is adapted for engaging the rear end of the seat cushion with the lower end of the seat back for the purpose of retaining the seat cushion at the use position where a seat occupant may sit thereon.

Now, described is how the seat cushion is folded upwardly. First, the seat cushion is moved upwardly in a swinging manner under the action of the aforesaid connecting means, so that the front end of the seat cushion is displaced upwardly, whereas the rear end thereof is drawn to the outside from below the lower end of the seat back, while it is being moved downwardly. Then, a disengagement operation is prepared to disengage the rear end of the seat cushion from the lower end of the seat back, and to thereby release a restrained state where the rear end of seat cushion is restrained by the lower end of seat back. Subsequently, while temporarily raising the front end portion of the seat cushion, the seat cushion is swingingly moved by approx. 90 degrees upwards under the action of the connecting means. As a result, the rear end of the seat cushion is displaced upwardly to a point corresponding to a vertically folded position, where the seat cushion is folded and stands substantially perpendicular to the floor of vehicle.

To return the seat cushion from the vertically folded position to the use position, at which a seat occupant may sit thereon, the seat back is returned to its upright home position, and thereafter the seat cushion is unfolded downwards in order that its rear end is slidingly brought to a location below the lower end of so vertically-set seat back, which is followed by an engagement operation for engaging the rear end of the seat cushion with the lower end of the seat back.

An engagement means for engaging the rear end of the seat cushion with the lower end of the seat back to retain the seat cushion at the above-said use position thereof, is shown for example, in Laid-Open Japanese Patent Publication No. 2009-255718. That shows an engagement means which comprises an engagement piece having a substantially "U" shape as viewed in plan. The engagement piece is formed by bending a wire into the substantially "U" shape and is provided to a rear end of a seat frame. The engagement piece is formed by combination of a plurality of wires (steel wires), such that the engagement piece projects in a direction rearwardly of the seat frame. A retainer member provided to a connecting rod is extended between left and right side frame members provided in the seat cushion. With this arrangement, the engagement piece is engaged with the retainer member. In another example, Japanese Laid-Open Publication No. 2007-191120 shows an engagement means, in which, a protruding portion defined in an upper area of a rear end of a seat cushion is engaged with a recessed portion defined in a rear end of a seat back.

PRIOR ART LITERATURE

Patent-Related Document

Patent-related Document 1: Laid-Open Patent Publication No. 2009-255718
Patent-related Document 2: Laid-Open Patent Publication No. 2007-191120

SUMMARY OF THE INVENTION

Problem to be Solved by the Invention

As stated above, Laid-Open Patent Publication No. 2007-191120 teaches engagement means comprised of a combination of: the protruding portion defined in the upper area of the rear end of the seat cushion and the recessed portion defined in the rear end of the seat back. Since those protruding and recessed portions are simply formed in the seat cushion and seat back, respectively, the structure of the engagement means is quite simplified for allowing engagement of the rear end of the seat cushion with the lower end of the seat back. However, the protruding portion is merely placed in the recessed portion, and therefore, for instance, when a passenger climbs onto or descends from a vehicle provided with such seat engagement means, a load is applied directly and intensively to the front end portion of the seat cushion. There is the likelihood that the protruding portion will be disengaged from the recessed portion. As a result, the seat cushion will be inclined forwardly, thereby causing the passenger sitting on the seat to have an unbalanced seating posture (that is, the passenger will feel in an unstable seating state).

In contrast to the foregoing prior art, the Laid-Open Patent Publication No. 2009-255718 discloses the engagement means comprised of a combination of the engagement piece projecting from the rear end of the seat cushion; and the retainer piece provided to the connecting rod extended between the left and right side frames. This arrangement, as opposed to the above-described combination of protruding and recessed portions, makes it possible to insure stable engagement of the rear end of the seat cushion with the lower end of the seat back. But, the retainer piece is required for engagement with the engagement piece provided to the rear end of the seat cushion.

With regard to a seat of this kind having a base element (support base), such as a seat suspension, provided between the vehicle floor and the seat, the seat cushion thereof is rotatably connected on such a base element by a connecting means provided to a front end portion of that seat cushion. The connecting means includes a substantially "U" shaped connecting rod element formed by bending a rod-like element into such substantially "U" shape, or a pair of left and right connecting links, for instance. Thus, the seat cushion can be swingingly unfolded upwards, with a rear end of the seat cushion being swingingly raised, and on the other hand, a seat back of the seat is disposed above the base element and can be folded forwardly and downwardly. In such arrangement, however, the front and lateral surfaces of the base element are exposed. Therefore, an under cover is typically provided to cover the base element, thereby making the base element invisible from the outside, so that degradation of outer aesthetic appearance quality of the seat is prevented. Further, an upper panel portion of the under cover overlies the upper surface of the base element, thus concealing that upper surface of the base element which is to be exposed to view at the time when the seat cushion of the seat is folded upwardly. This also prevents degradation of the outer aesthetic appearance quality of the seat.

In most of the under covers stated above, the upper panel portion thereof is formed in such a configuration that the rear end area of the upper panel portion, adjacent to the lower end of the seat back, slopes upwardly in conformity with the contour of the base element. This configuration of the upper panel portion's rear end area does not interfere with an engagement piece formed to project outwardly from the rear end of the seat cushion. In other words, when the seat cushion is folded upwardly, the engagement piece projecting from the rear end of the seat cushion is also drawn outwardly from the lower end of the seat back. At that time, the upwardly-sloped rear end area of the upper panel portion does not interfere with such engagement piece, but permits outward withdrawal of the engagement piece therethrough. However, there is a problem associated with such a projection of the engagement piece from the rear end of the seat cushion. When unfolding the seat cushion downwardly back to the use position where a seat occupant may sit thereon, the rear end of that seat cushion is slidingly brought to a location below the lower end of the seat back. But at that time, the upwardly sloped rear end region of the upper panel portion lies in such a position where it stands in the way of the engagement piece being moved thereto. Consequently, it is highly possible that the engagement piece projecting from the rear end of the seat cushion will be contacted with and caught by the upwardly-sloped rear end area of upper panel portion, which will cause a user to have an uncomfortable feeling (a feeling that the seat cushion is caught by something). In that instance, it is also possible that an objectionable noise will be generated and further that the upwardly sloped surface of the upper panel portion will be damaged and injured.

It is a purpose of the present invention to provide a vehicle seat of the type having an upwardly foldable seat cushion, which enables a user to move a seat cushion of the vehicle seat, without any uncomfortable feeling, so that a rear end of the seat cushion is smoothly brought to a lower end of a seat back of the vehicle seat.

Means for Solving the Problem

In accordance with the present invention, there is provided a seat for use in a vehicle, wherein the seat is of the type having a seat cushion which is foldable upwardly, wherein the seat cushion and a seat back of the seat are provided on or above a floor of the vehicle, wherein the seat cushion has an engagement piece projecting from the rear end thereof, so that the engagement piece is engageable with a lower end of the seat back to thereby retain the seat cushion at a substantially horizontal use position where a seat occupant is to sit on the seat cushion, and wherein the seat cushion is foldable upwardly and forwardly from the use position to a vertically folded position where the seat cushion is to be set in a stored condition. The aforesaid seat includes a guide portion at the floor of the vehicle, wherein the guide portion is adapted for guiding the engagement piece therein, when the seat cushion is moved between the use position and the vertically folded position.

Mode for Carrying Out the Invention

According to a vehicle seat of the present invention, an engagement piece is provided to a rear end of a seat cushion of the seat so as to project therefrom. Such engagement piece can be pressed against and frictionally engaged with a lower end of a seat back of the seat, in order to set the seat cushion at a substantially horizontal use position where a seat occupant may sit thereon. Also, an under cover is provided, which has an upper panel portion covering an upper surface of a base element. The engagement piece, which can be pressed against and engaged with the lower end of the seat back, projects from the rear end of the seat cushion, and the upper panel portion has an upwardly sloped rear end region. When the seat cushion that has been upwardly folded to a vertically folded position is unfolded downwards back to a use position where a seat occupant may sit thereon, the rear end of the seat cushion is slidingly brought towards the lower end of the seat, back. At this point, the upwardly-sloped rear end region of the upper panel portion would stand in the way of the engagement piece being moved thereto. But, a guide groove is formed in a surface of such upwardly-sloped rear end region of the upper panel portion so as to extend in the forward and rearward directions. Hence, the engagement piece can be moved in and along the guide groove, without being contacted with the upwardly sloped rear region of upper panel portion, and slidingly brought into engagement with the lower end of the seat back. For example, the upper panel portion used may be made of a synthetic resin material, and ribs are formed in a bottom surface of the guide, groove of the upper panel portion, wherein the ribs extend in the forward and rearward directions of the guide groove.

Effects of the Invention

The engagement piece can be slidingly is brought into the guide portion provided on or above the floor of the vehicle.

This avoids contact of the engagement piece with an upper surface associated with the floor of the vehicle. Therefore, it is possible to prevent the engagement piece from being caught by that upper surface associated with the floor of the vehicle and to allow the engagement piece to be brought to a sliding contact with the lower end of the seat back, so that the engagement piece is pressed by and frictionally engaged with the lower end of the seat back. This arrangement permits a user to smoothly move the seat cushion, without any uncomfortable feeling, in order to slidingly bring the rear end of that seat cushion to the lower end of the seat back.

BRIEF DESCRIPTION OF THE DRAWINGS

FIGS. 1A, 1B and 1C show side views of one exemplary embodiment of a vehicle seat in accordance with the present invention.

DESCRIPTION OF AN EMBODIMENT

Figure 1A:
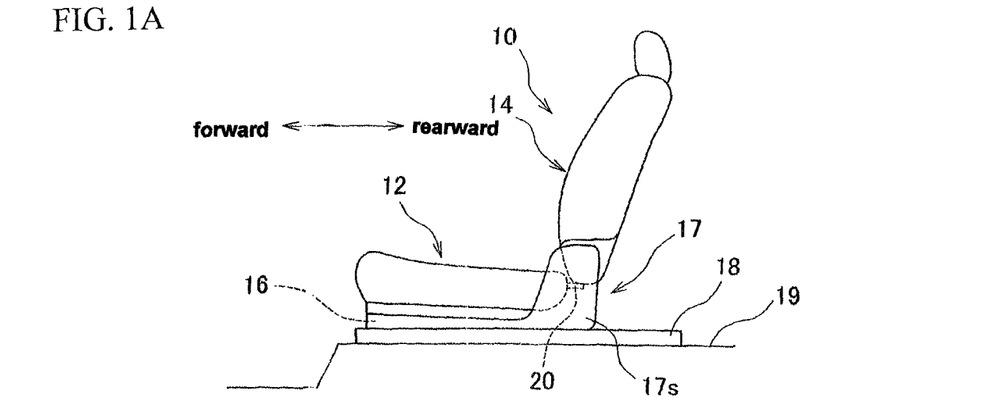
FIG. 1A schematically shows a state where the vehicle seat is set in a use position where a seat occupant may sit thereon.
Figure 1B:
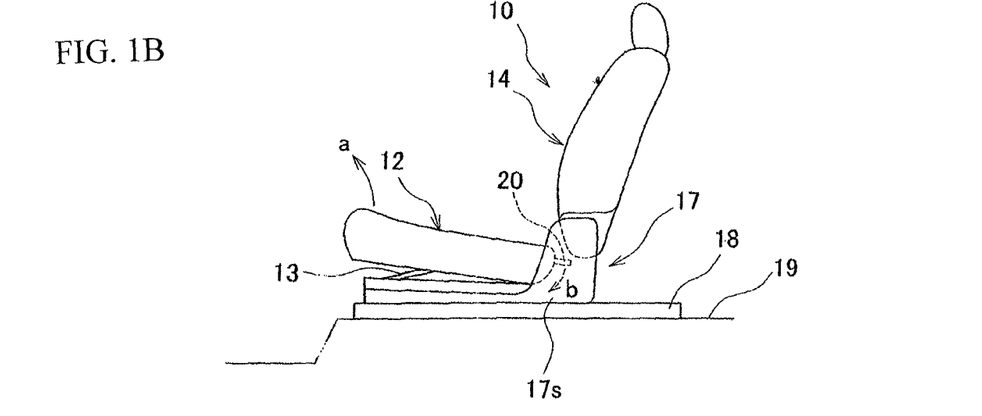
FIG. 1B schematically shows a state where a seat cushion of the seat is being disengaged from a seat back of the seat.
Figure 1C:
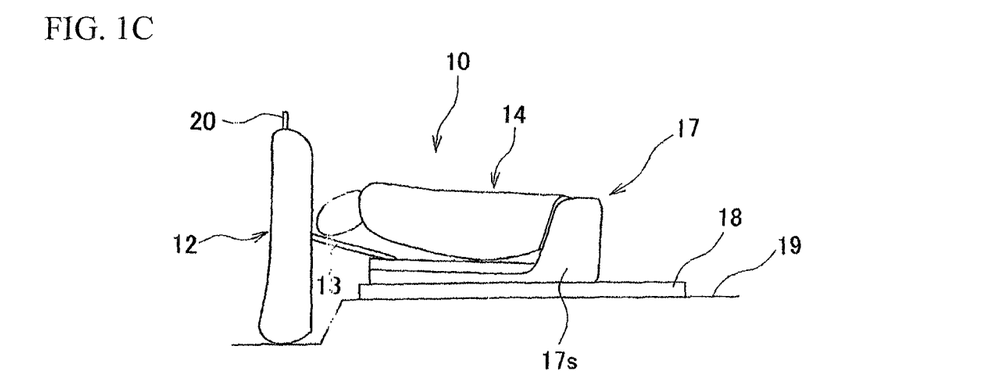
FIG. 1C schematically shows a folded state of the vehicle seat, with the seat back of the seat displaced upwardly to a vertically folded position.

Hereinafter, a description will be made of one exemplary embodiment of the present invention, with reference to the drawings. FIGS. 1A, 1B and 1C show one exemplary embodiment of a vehicle seat in accordance with the present invention, and the three Figures are respectively schematically show a state where the vehicle seat is set in a use position at which a seat occupant can sit thereon; a state where the vehicle seat is about to be unlocked and folded; and a schematic side view showing a folded state of the vehicle seat, with the seat cushion thereof displaced upwardly to a vertically folded position.

As shown in FIG. 1A, a vehicle seat 10 comprises a seat cushion 12 and a seat back 14 disposed at a rear end of the seat cushion. The vehicle seat is of the type allowing the seat cushion to be folded upwardly, while the seat back is folded forwardly and downwardly. As shown in FIG. 10, the seat cushion can be folded upwardly, by raising the rear end thereof, to a vertically folded position substantially perpendicular to a floor of vehicle and can be retained at that vertically folded position. After that, the seat back 14 can be folded forwardly and downwardly to a vacant space where the seat cushion 12 had been positioned before, thereby defining a loading area upon a rear surface of the thus-folded seat back, so that for example a luggage space is provided there.

In the shown embodiment, the seat cushion 12 is formed as an integral 1.5 passenger seat (one-and-half-passenger seat), which is formed by a seat cushion area to be occupied by one passenger and a half seat cushion area, in an, integral manner. A base element 16 is movable, via a seat slide device 18, above a floor of vehicle 19, so that the base element is movable in the forward and rearward directions of the seat. The seat cushion 12 is mounted on the base element 16 such that a substantially central area of the seat cushion is connected by a connecting means 13 to the base element and while the rear end of the seat cushion can be moved upwardly when the seat cushion is folded upwardly. On the other hand, the seat back 14 is disposed above the base element 16 and foldable forwardly and downwardly. An under cover 17 is attached on the base element 16 so as to cover a whole of the base element, thus making the base element itself invisible from the outside.

The connecting means 13 for example comprises a substantially "U" shaped connecting rod which is formed by bending a rod-like element into a substantially "U" shape having left and right arms as well as an intermediate portion defined between those two arms. The left and right arms are rotatably supported on the base element 16, whereas the intermediate portion is pivotally connected with a frame of the seat cushion 12 (i.e. seat cushion frame). With this arrangement, the seat cushion can be moved swingingly and rotatively towards and away from the base element, so that a user can raise the rear end of the seat cushion to fold the seat cushion upwardly.

It is noted here that the seat cushion 12 may be movably mounted on the floor of vehicle 19, without the base element 16 provided therebetween, to allow the seat cushion to be folded upwardly from the floor of vehicle, and the seat slide device 18 may be demounted.

An engagement piece 20 projects outwardly from the rear end of the seat cushion and is pressed by and frictionally engaged with the lower end of the seat back. This engagement piece is therefore provided as an engagement means workable to set and retain the seat cushion at a substantially horizontal use position where a seat occupant can sit thereon.

When the seat cushion 12 is folded upwardly under the action of the connecting means 13 in a swinging manner, with the rear end of the seat cushion being moved upwardly, as indicated by the arrow a in FIG. 1B, the engagement piece 20 provided to the rear end of the seat cushion is drawn to the outside, while being moved downwardly, and then displaced away from the lower end of the seat back. Consequently, the rear end of the seat cushion is disengaged from the lower end of the seat back, whereupon the seat cushion 12 is released from a restrained state where it is restrained by the lower end of the seat cushion. Thereafter, while lifting the front end portion of the seat cushion upwardly, the seat cushion 12 is folded swingingly upwards by approx. 90 degrees under the action of the connecting means 13, with the rear end of the seat cushion being also displaced upwardly. As a result, the seat cushion is folded to and retained at a vertically folded position substantially perpendicular to the floor of vehicle 19. (See FIG. 1C) Referring to FIGS. 2A and 2B, the under cover 17 is formed in a substantially box-like or tray configuration which is opened in the bottom side thereof and has an upper panel portion 17u (an upper plate wall), a front panel portion 17f, and a side panel portion 17s.

Figure 2A:
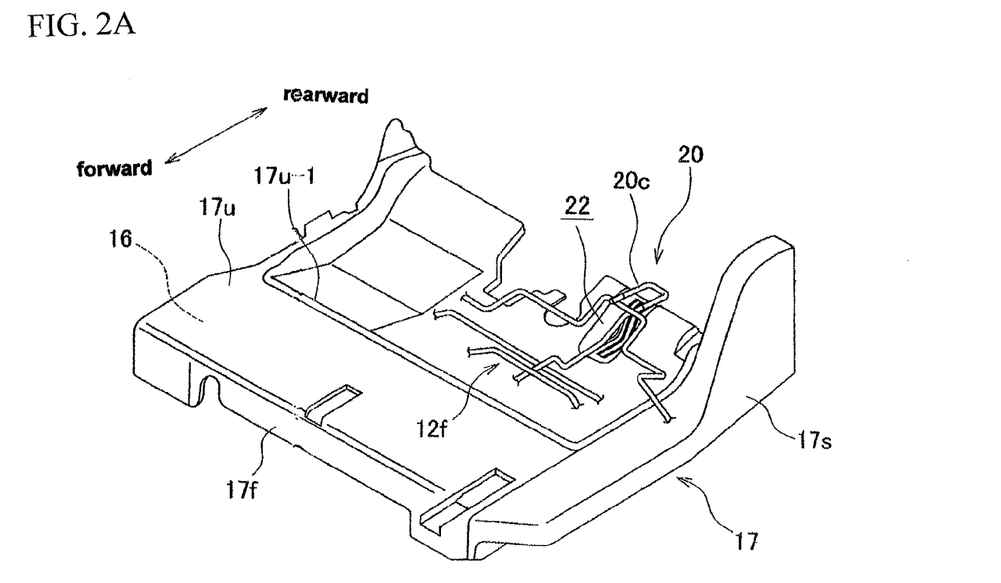
FIG. 2A is a perspective view of an under cover.
Figure 2B:
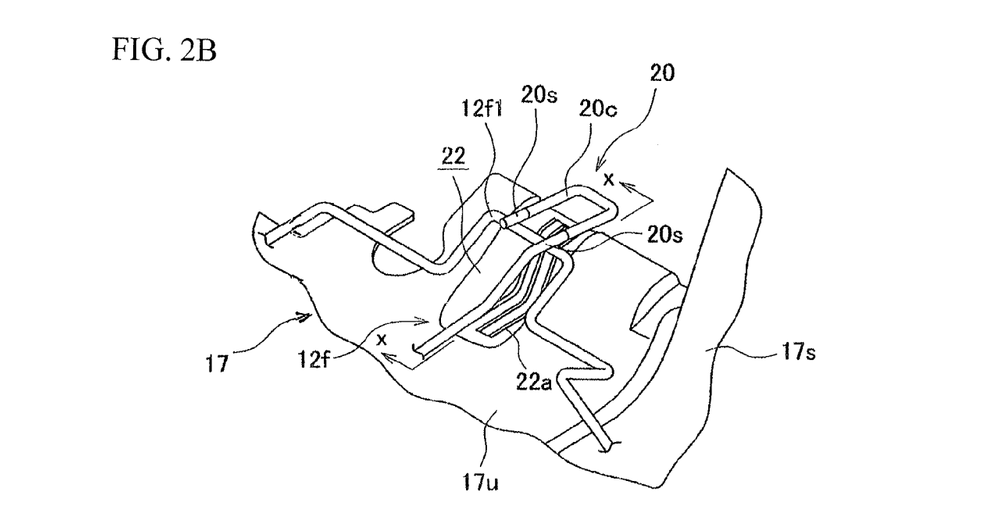
FIG. 2B is a partly-broken enlarged view of the under cover.

For example, the upper panel portion 17u and the front panel portion 17f may be made of a synthetic resin material and may be formed integrally with each other. Those upper and front panel portions are attached upon and cover the upper and front surface portions of the covering element 16, respectively. The side panel portion 17s may also be made of a synthetic resin material, but provided independently of the upper and front panel portions 17u and 17f. The illustrated side panel portion 17s is attached to and covers the left side surface of the base element.

As the front and left side surfaces of the base element 16 are covered with the front and side panel portions 17f and 17s, respectively, that prevents base element from being exposed and viewed from the outside, which avoids degradation of the outer aesthetic appearance quality of the seat 10. Also, the upper panel portion 17*u* is attached on and covers and conceals the upper surface of the covering element 16.

For example, in FIG. 2B, the seat cushion frame 12*f* may be formed by assembling a plurality of wires (steel wires) together into the illustrated configuration. The engagement piece 20 is in a substantially "U" shape as viewed in plan, for example by bending a rear end portion of the seat cushion frame into such substantially "U" shape.

In FIGS. 2A and 2B, to avoid complicated illustrations therein the seat cushion itself is omitted. But, in those two Figures, the seat cushion frame 12*f* provided within the seat cushion is shown to be directly disposed on the upper panel portion 17*u* of the under cover which is attached on and covers the base element 16.

According to the illustrated embodiment, the aforesaid engagement piece 20, formed in a substantially "U" shape as viewed in plan, has left and right side frames 20*s* (formed from a wire) which are respectively formed short and long, thus having an asymmetrical relation with each other. Those left and right side frames 20*s* are respectively welded on two leftwise-and-rightwise or transversely extending wire members 12*f* 1 which are one of constituent elements of the seat cushion frame 12*f*. Also, the engagement piece 20 is covered with a soft covering element 20*c* which may be made of a soft synthetic resin material, a soft rubber, or the like.

Figure 3A:
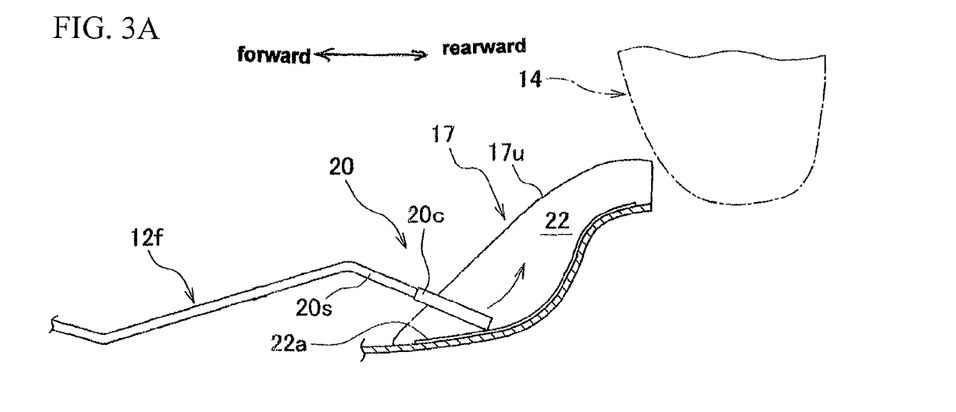
FIGS. 3A, 3B and 3C are each a longitudinal sectional view taken along the line X-X in FIG. 2B, in which an engagement piece is shown as being moved in a guide groove in a direction for engagement with a lower end of the seat back.
Figure 3B:
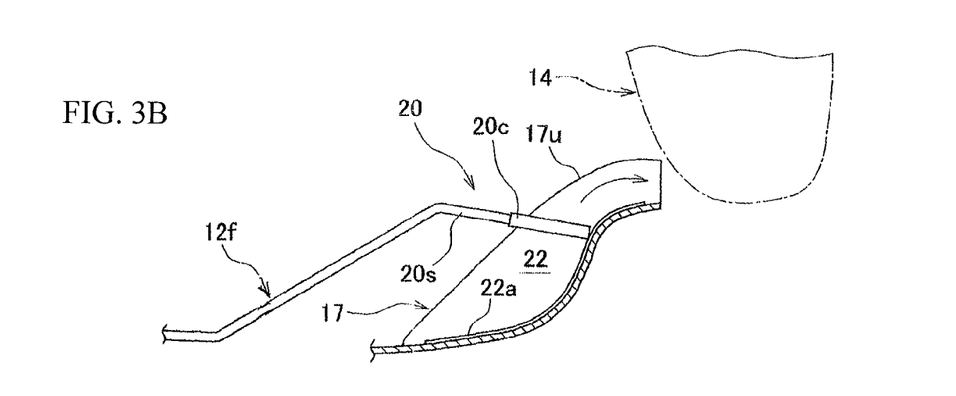
Figure 3C:
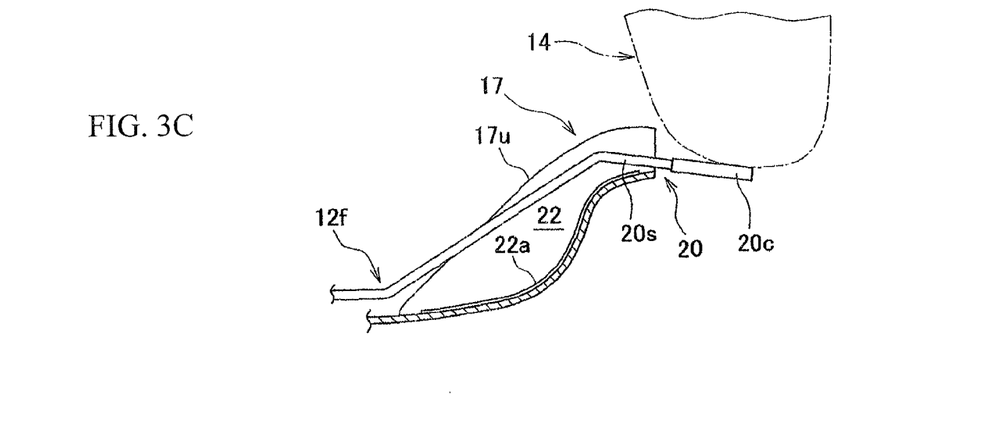
Figure 4:
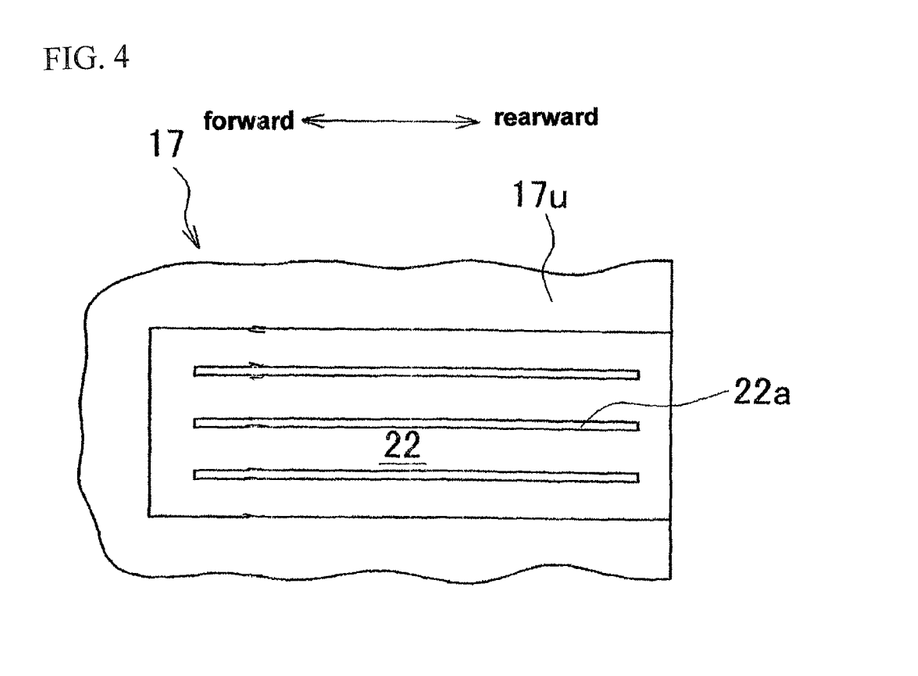
FIG. 4 is a partly-broken plan view of the upper panel portion of the under cover.

A guide groove (a recessed portion) shown in FIGS. 3 and 4 is formed in an upper surface of the rear end area of the upper panel portion 17*u* (of the under cover) covering the upper surface of the base element. This guide groove 22 is a guide portion which extends in the forward and rearward directions and allows the engagement piece to be moved therein, without contacting the aforesaid upper surface of the upper panel portion, at the time when the rear end of the seat cushion is engaged with or disengaged from the lower end of the seat back via the engagement piece.

Referring to FIGS. 3A, 3B and 3C in FIGS. 2A and 2B, the rear end area of the upper panel portion 17*u* of the under cover is has an upwardly sloped surface. The guide groove 22 (recessed portion) is defined in such an upwardly sloped surface of the upper panel portion's rear end area so as to extend in the forward and rearward directions. More specifically, the guide groove 22, which has a bottom surface inclined upwardly, is formed in an upper surface (upwardly sloped surface) of the rear end area of the upper panel portion, in such a manner that the bottom surface of the guide groove extends in the forward and rearward directions, and the guide groove has a steeply sloped region defined substantially in the mid area thereof; and two gently sloped regions defined respectively in the forward and rearward sides of the steeply sloped region.

Further, as shown in FIG. 4, a plurality of ribs 22*a* (rectilinearly-extending protruding portions) are formed in the aforesaid bottom surface of the guide groove so as to extend in the forward and rearward directions. In the present embodiment, three equidistantly-spaced-apart ribs are shown to be formed in the bottom surface of the guide groove, wherein those three ribs are arrayed abreast of one another in the leftwise-and-rightwise or transverse direction of the guide groove.

A description will now be made with regard to movement of the engagement piece (i.e. movement of the engagement piece towards the lower end of the seat back) at the time when the rear end of the seat cushion is slidingly brought to and engaged with the lower end of the seat back.

For example, suppose that the seat cushion starts at the upwardly folded position shown in FIG. 1C and is to be unfolded therefrom back to the use position shown in FIG. 1A. For that purpose, at first, the seat back 14 is unfolded back to the upright home position thereof. Secondly, the seat cushion 12 is unfolded swingingly downwards under the action of the connecting means 13, so that the rear end of the seat cushion is brought close to the lower end of the seat back. Then, as shown in FIG. 3A, the engagement piece 20 provided at the rear end of the seat cushion is entered into the guide groove 22 formed in the upwardly sloped surface of the rear end area of the upper panel portion. As can be seen in the arrow direction in FIG. 3A. Upon entering the guide groove 22, the engagement piece 20 is brought to a contact with the bottom surface of the guide groove and then guided by that guide groove. Namely, the engagement piece is moved, while being elevated, in and along the guide groove in a direction to the lower end of the seat back (i.e. in the rearward direction), while the seat cushion 12 is being further moved swingingly towards the seat back.

Then, as indicated in FIG. 3B, the engagement piece 20 reaches the upper end area of the guide groove 22 and slides thereon downwardly toward the lower end of the seat back, with the result that the engagement piece is pressed against and frictionally engaged with the lower end of the seat back, thus completing engagement of the seat cushion's rear end with the seat back's lower end. In that manner, the seat cushion 12 is returned to and set at the use position where a seat occupant may sit thereon. This can also be understood more clearly from FIG. 3C in which the engagement piece 20 extending from the rear end of the seat cushion is engaged with the lower end of the seat back, whereupon it is to be seen that the seat cushion 12 is set at the substantially horizontal use position shown in FIG. 1A, at which a seat occupant may sit on the cushion.

As described above, the guide groove 22 allows ingress therein and egress therefrom of the engagement piece 20 projecting from the seat cushion's rear end, and such guide groove is formed in the upwardly sloped surface (upper surface) of the rear end area of the upper panel portion 17*u*. With this arrangement, the engagement piece can be brought into the guide groove which serves as a passing space (through passage) that permits the engagement piece to be moved therethrough, free of contact with the upper panel portion's rear end area which slopes upwardly as if it would stand in the way of the engagement piece, whereby the engagement piece is prevented from being contacted with the upwardly sloped surface of, the upper panel portion's rear end area. Accordingly, the engagement piece is guided by the guide groove 22 and moved rearwardly therein, without being caught by the upwardly sloped surface of the rear end area of upper panel portion, and eventually, the engagement piece is pressed against and frictionally engaged with the lower end of the seat back. Hence, it is possible to smoothly unfold the seat cushion back to the use position where a seat occupant may sit thereon.

In addition, since the engagement piece 20 is not caught by the upwardly sloped surface of the upper panel portion's rear end area as stated above, a user does not have an uncomfortable feeling (a feeling that the seat cushion is caught by something) when unfolding the seat cushion. Further, such arrangement for preventing the engagement piece 20 from being caught by the upwardly sloped surface (upper surface) of the upper panel portion's rear end area is also effective in avoiding generation of an objectionable noise and avoiding damage and injury to the afore-said upwardly sloped surface.

Also, despite the fact that the engagement piece 20 projects outwardly from the rear end of the seat cushion, when folding the seat cushion 12 upwardly, the engagement piece can be drawn from the lower end of the seat back to the outside, without being caught by the upwardly sloped surface of the upper panel portion's rear end area, since the upwardly sloped surface of the upper panel portion's rear end area does not stand in the way of such engagement piece being drawn outwards from the lower end of the seat back. In other words, the guide groove (recessed portion) 22 is formed in the upwardly sloped surface of the upper panel portion's rear end area so as to extend in the longitudinal direction thereof, and therefore, the engagement piece 20, when moved in a direction opposite to the direction of its movement shown in FIGS. 3A to 3C, can be drawn from the lower end of the seat back and displaced in and along that guide groove, while being moved downwardly, which permits the seat cushion 12 to be folded upwardly, with rapidity and smoothness.

The engagement piece 20 projecting from the rear end of the seat cushion is directly pressed by and frictionally engaged with the lower end of the seat back. This eliminates the necessity for providing a retainer member adapted to be engaged with the engagement piece. Hence, it is possible to simplify the structure of the engagement means for engaging the rear end of the seat cushion with the lower end of the seat back.

Since the upper panel portion 17u, is made of a synthetic resin material, it is possible to easily form a guide groove 22 in the upwardly sloped surface of the rear end area of the upper panel portion, and also the ribs (rectilinearly-extending protruding portions) 22a can be easily formed in the bottom surface of the guide groove 22 so as to extend in the forward and rearward directions. This provides a linear contact between the engagement piece 20 and the ribs, which facilitates the sliding movement of the engagement piece 20 in and along the guide groove 22, thereby realizing a rapid unfolding of the seat cushion 12 back to the use position thereof where a seat occupant may sit thereon.

In the illustrated embodiment, the left and right side frame portions (formed from a wire) 20s of the engagement piece 20 having a substantially "U" shape as viewed in plan are respectively welded on the two leftwise-and-rightwise or transversely extending wires 12/1 which are one of constituent elements of the cushion frame 12f. It is to be seen that those two wires 12/1 function as a reinforcing member to retain the left and right side frame portions against movement. This arrangement therefore insures that the engagement piece 20 itself is pressed against the lower end of the seat back and frictionally engaged therewith, without any clearance left between the rear end of the seat cushion and the lower end of the seat back.

Further, the engagement piece is covered with the covering element 20c of a soft property. Thus, such covering element avoids damage and injury to the lower end of the seat back at the time when the engagement piece' is directly pressed against and engaged with the lower end of the seat back.

As described above, in accordance with the present invention, the engagement piece is entered into the guide groove formed in the rear end area of the upper panel portion, and therefore, the engagement piece can be moved therethrough, without being caught by the upwardly sloped surface of the rear end area of the upper panel portion, and eventually brought to a sliding contact with the lower end of the seat back, so that the engagement piece is pressed against and frictionally engaged with that lower end of the seat back. Accordingly, a user can move the seat cushion, without having an uncomfortable feeling (a feeling that the seat cushion is caught by something) which would be given if the engagement piece would be caught by the upwardly sloped surface of the upper panel portion's rear end area, so that the rear end of the seat cushion is smoothly brought to the lower end of the seat back in a sliding manner. Hence, the seat cushion can be smoothly returned to the use portion thereof where a seat occupant can sit thereon.

It should be understood that the above-described embodiment is intended to explain the present invention by way of one example and thus do not particularly limit the invention to the embodiment. Therefore, needless to mention, any modification, any conversion, or the like may be applied to the invention without departing from the technical scopes of the appended claims, and any modified or converted mode of the invention to be adopted under such conditions will naturally be encompassed by the scopes of the present invention.

For instance, in the illustrated embodiment, the guide groove is shown in longitudinal section as having: a steeply sloped region in the mid area thereof, which slopes steeply upwards; and two gently sloped region defined respectively in the forward and rearward sides of the steeply sloped region. However, the guide groove is not limited to such longitudinally sectional configuration, but may be formed in any other configuration, insofar as it can function as a passing space (through passage) which permits the engagement piece to move therethrough, without being contacted with the upwardly sloped surface of the rear end area of the upper panel portion.

In general, the present invention is made adaptable for use with any vehicle seat of the type wherein the seat cushion thereof is foldable upwardly, while the seat back thereof foldable forwardly and downwardly. But, for example, the invention can be applied to a seat for use in a train or an airplane, and also the invention can be applied to a seat provided in a movie theater, a theater, a concert hall or the like, in which case, the seat cushion thereof can be folded upwardly to provide an open space (as similar to a luggage space as described previously).

DESCRIPTION OF THE REFERENCE NUMERALS 10 denotes a vehicle seat.
12 denotes a seat cushion.
12f denotes a seat cushion frame.
14 denotes a sea back.
16 denotes a base element.
17 denotes an under cover.
17u denotes an upper panel portion.
20 denotes an engagement piece.
20c denotes a covering element.
22 denotes a guide groove (passing space).
22a denotes ribs (rectilinearly-extending protruding portions).

The invention claimed is:
1. A vehicle seat for a vehicle, said seat comprising:
a seat back;
an upwardly foldable seat cushion foldable upwardly, said seat cushion and the seat back provided on or above a floor of said vehicle;
an engagement piece projecting from a rear end of the seat cushion, so that said engagement piece is engageable with a lower end of said seat back to thereby retain said seat cushion at a substantially horizontal use position for seating an occupant,
wherein said seat cushion is foldable upwardly and forwardly from said use position to a vertically folded stored position; and
a guide portion provided at said floor of said vehicle, wherein said guide portion guides the engagement piece, such that the engagement piece moves in a backward direction in the guide portion to engage with the lower end of the seat back when the seat cushion is moved between said vertically folded position.

2. The seat as claimed in claim 1, further comprising a base element positioned on a side of said floor of the vehicle; and an under cover made of a synthetic resin material,
wherein said guide portion is formed in the under cover, said under cover being attached on and covering an upper surface of the base element, and
wherein said seat cushion is movably connected with said side of said floor of said vehicle.

3. The seat as claimed in claim 2, wherein said guide portion is formed in a rear end area of an upper panel portion of said under cover.

4. The seat as claimed in claim 1, wherein said guide portion is formed in a recessed manner.

5. The seat as claimed in claim 1, further comprising at least one rib formed in a bottom surface of said guide portion so as to extend in forward and rearward directions.

6. The seat as claimed in claim 1, wherein said engagement piece has a substantially "U" shape as viewed in plan and is welded to a rear end portion of a seat cushion frame of said seat cushion.

7. The seat as claimed in claim 1, wherein said guide portion extends in forward and rearward directions of the seat, and comprises:
a steeply sloped region defined in the mid area of the guide portion; and
two gently sloped regions defined respectively in forward and rearward sides of said steeply sloped region.

8. The seat as described in claim 1, wherein said guide portion configured to allow said engagement piece to slide therein.

* * * * *